United States Patent
Park et al.

(10) Patent No.: US 10,389,248 B1
(45) Date of Patent: Aug. 20, 2019

(54) METHOD AND APPARATUS FOR MINIMIZING VOLTAGE DROOP DUE TO LOAD STEP DURING ENERGY CONSERVATION OPERATION

(71) Applicant: Renesas Electronics America Inc., Milpitas, CA (US)

(72) Inventors: Byongho Park, Cary, NC (US); Edward Coleman, Salt Springs, FL (US); Chris Jurado, Cary, NC (US); Shawn Evans, Raleigh, NC (US); Noboru Kagemoto, Pleasanton, CA (US); Daniel Zheng, Morrisville, NC (US)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 0 days.

(21) Appl. No.: 15/958,377

(22) Filed: Apr. 20, 2018

(51) Int. Cl.
  *H02M 3/158* (2006.01)
  *H02M 1/15* (2006.01)
  *H02M 1/08* (2006.01)
  *H02M 3/157* (2006.01)

(52) U.S. Cl.
  CPC .......... *H02M 3/158* (2013.01); *H02M 1/083* (2013.01); *H02M 1/15* (2013.01); *H02M 3/157* (2013.01)

(58) Field of Classification Search
  CPC .. H02M 3/158; H02M 3/1588; H02M 3/1582; H02M 2001/0045; H02M 2001/0067; H02M 3/156; H02M 2003/1566; H02M 3/155; G05F 1/614; G05F 1/618
  See application file for complete search history.

(56) References Cited

U.S. PATENT DOCUMENTS

| | | | |
|---|---|---|---|
| 6,366,070 B1 * | 4/2002 | Cooke | H02M 3/1588 323/222 |
| 7,800,352 B2 | 9/2010 | Qiu et al. | |
| 9,647,558 B2 | 5/2017 | Houston et al. | |
| 2007/0103136 A1 * | 5/2007 | Jain | G06F 1/26 323/282 |

* cited by examiner

*Primary Examiner* — Adolf D Berhane
*Assistant Examiner* — Afework S Demisse
(74) *Attorney, Agent, or Firm* — Foley & Lardner LLP

(57) ABSTRACT

The present embodiments are directed to circuitry and techniques for operating a switching regulator, including in connection with transitions out of energy conservation modes during which a minimal amount of current is drawn from a power source such as a battery. According to certain aspects, embodiments of an energy conservation mode include provisions for maintaining high performance voltage regulation even in the face of a sudden increase in load requirements. These and other embodiments can further include various techniques for signaling an appropriate transition for exiting out of energy conservation mode and into a continuous conduction mode.

18 Claims, 16 Drawing Sheets

METHOD AND APPARATUS FOR MINIMIZING VOLTAGE DROOP DUE TO LOAD STEP DURING ENERGY CONSERVATION OPERATION

TECHNICAL FIELD

The present embodiments relate generally to power control and more particularly to methods and apparatuses for controlling power so as minimize voltage droop due to load step during transitions out of energy conservation modes of operation.

BACKGROUND

There are many useful applications for power controllers, voltage regulators, DC/DC converters, and the like. Some applications, such as where a voltage regulator is being used to supply a regulated voltage to an electronic device from a car battery (e.g. via a USB interface), require very low quiescent currents when the electronic device is not being used so as not to unnecessarily drain the car battery. Designing a voltage regulator for such applications, can be challenging, particularly when other design requirements need to be considered. For example, the voltage regulator should able to efficiently respond to a sudden change in current requirements, such as when an electronic device is activated after a period of inactivity.

SUMMARY

The present embodiments are directed to circuitry and techniques for operating a switching regulator, including in connection with transitions out of energy conservation modes during which a minimal amount of current is drawn from a power source such as a battery. According to certain aspects, embodiments of an energy conservation mode include provisions for maintaining high performance voltage regulation even in the face of a sudden increase in load requirements. These and other embodiments can further include various techniques for signaling an appropriate transition for exiting out of energy conservation mode and into a continuous conduction mode.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
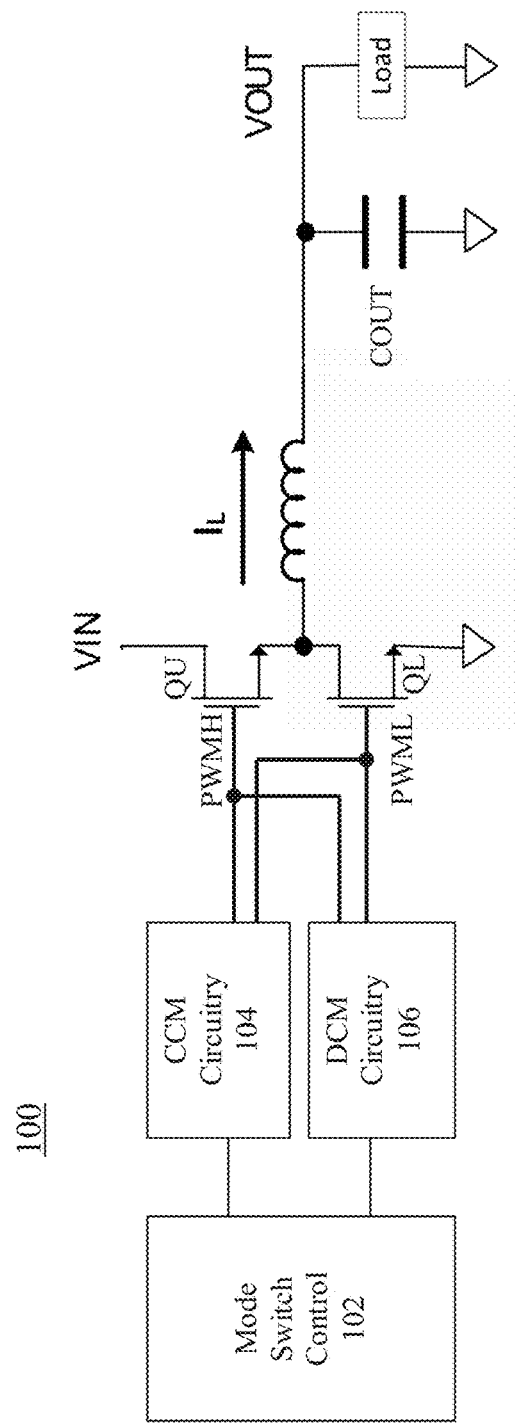
FIG. 1 is a block diagram illustrating an example conventional converter.

The present embodiments will now be described in detail with reference to the drawings, which are provided as illustrative examples of the embodiments so as to enable those skilled in the art to practice the embodiments and alternatives thereof as will be apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments are directed to circuitry and techniques for operating a switching regulator, including in connection with transitions out of energy conservation modes during which a minimal amount of current is drawn from a power source such as a battery. According to certain aspects, embodiments of an energy conservation mode include provisions for maintaining high performance voltage regulation even in the face of a sudden increase in load requirements. These and other embodiments can further include various techniques for signaling an appropriate transition for exiting out of energy conservation mode and into a continuous conduction mode.

Switching regulators (e.g., DC-DC converters, or simply, converters) are useful for converting an input voltage (e.g. from a battery) to a regulated output voltage (e.g. for supplying to a load such as an electronic device). A conventional control scheme for switching regulators is pulse-width modulation (PWM). PWM control generally achieves good regulation, low noise spectrum, and high power efficiency. However, when the load current is low, the PWM mode is known to be inefficient, primarily due to switching loss and high quiescent current. Accordingly, in one improved arrangement, the converter normally operates in continuous-conduction-mode (CCM), and automatically enters discontinuous conduction mode (DCM) at low load conditions for optimum efficiency. DCM is also known as pulse frequency modulation (PFM) or Diode Emulation Mode (DEM). In some configurations, under CCM, the converter operates with a constant switching frequency (Fs) and/or duty cycle (D). Under DCM, the switching frequency and/or duty cycle is adjusted according to the load.

FIG. 1 is a block diagram illustrating an example conventional converter 100. This illustrated example converter is a buck converter, where the input voltage VIN is converted to a lower output voltage VOUT. However, the principles of the present embodiments are not limited to such types of converters. Moreover, although only a single phase is shown, those skilled in the art will understand how the principles of the present embodiments can be extended to multi-phase implementations.

As shown in FIG. 1, depending on the operational mode, as controlled by mode switch control 102, either CCM circuitry 104 or DCM circuitry 106 provides the PWM drive signals PWMH and PWML to respectively drive two synchronous power switches, a high-side FET, shown at QU, and a low-side FET, shown at QL. Buck converter 100 operates with CCM circuitry 104 to drive synchronous switches QU and QL to improve efficiency in the converter's continuous conduction mode. To improve light load efficiency, converter 100 activates DCM circuitry 106 to achieve discontinuous conduction mode operation. In one example implementation, buck converter 100 operates in continuous conduction mode such that the current $I_L$ through the inductor $L_O$ never falls to zero during a commutation period T. The frequency of operation Fs (i.e., the switching frequency) of buck converter 100 is the inverse of the commutation or switching period T. Buck converter 100 operates in discontinuous conduction mode when the amount of energy required by the load is too small to maintain CCM operation. In this mode, the current through inductor $L_O$ falls to zero during part of the commutation period.

The present applicant recognizes various shortcomings of conventional implementations of converters such as buck converter 100. For example, due to very low quiescent current requirements of some applications such as a car battery operated system (i.e. the car battery provides VIN), the system should only use a minimal number of very low power circuits so that the total current drawn at no load is less than 5 µA (in this example application) while maintaining voltage regulation. Meanwhile, existing methods of DCM operation allow for inductor ripple current to about 40% of the maximum load so as to minimize the output ripple voltage. This can allow for a large output voltage dip when a full load step occurs since it takes tens of microseconds to wake up high precision analog blocks when transitioning to CCM mode. As used herein, the term load step refers to a condition where, for example, there is a sudden (e.g., over several microseconds or less) and substantial (e.g. double or more of the amount of current) increase in demand for power at the load.

Figure 2:
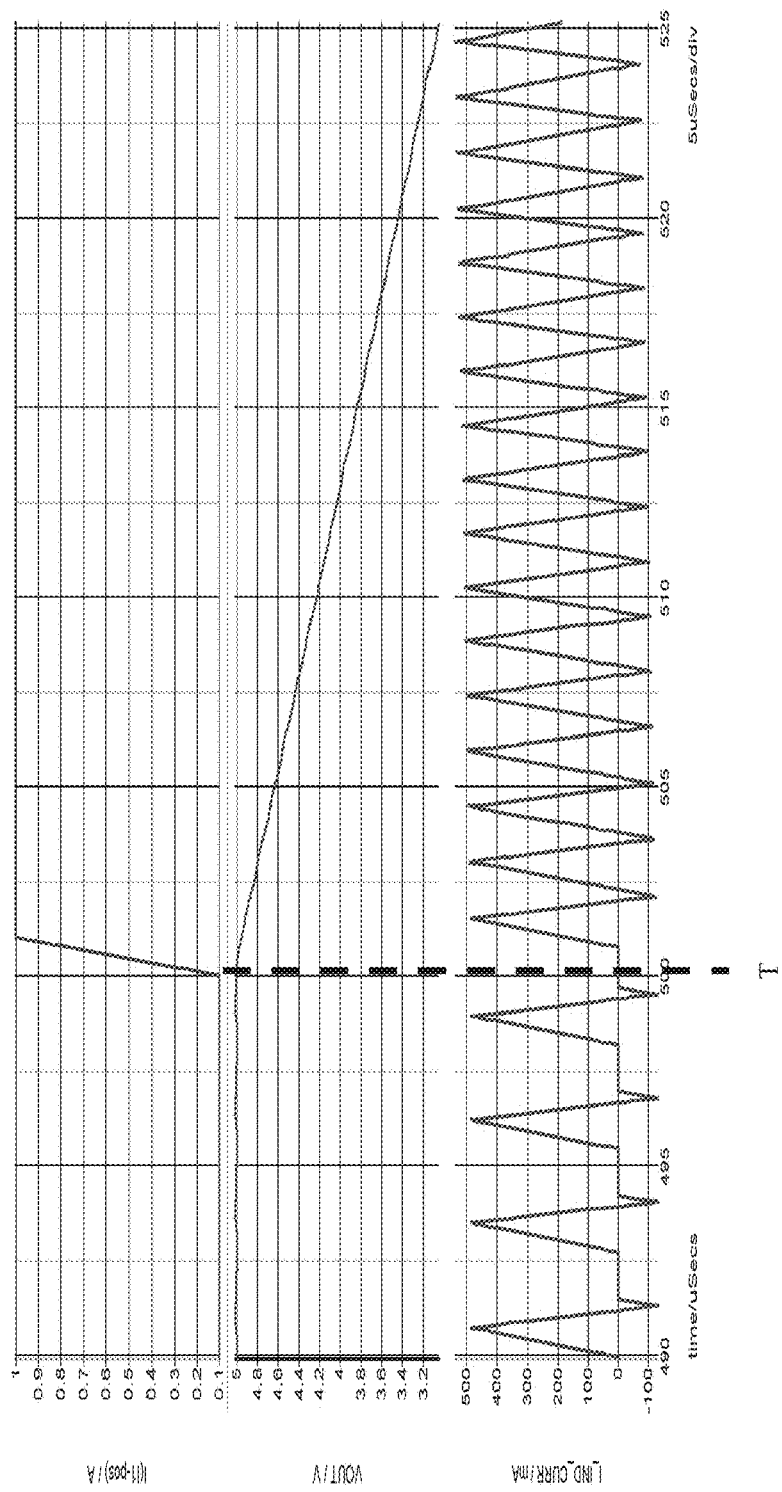
FIG. 2 is a timing diagram illustrating certain operational aspects of the conventional converter shown in FIG. 1.

For example, as shown in FIG. 2, during a sudden current transient in a conventional DCM exit operation (e.g., increasing load current from 0.1 A to 1 A in 1 µs starting at time T), the output voltage will drop down to about 3.1V before CCM circuitry kicks in (and bring VOUT back up to 5V). This amount of voltage droop is unacceptable in many applications. Returning to the example of FIG. 1, one possible solution is to increase the size of the output capacitor $C_{OUT}$. However, to keep the output voltage drop within a −7% requirement, $C_{OUT}$ may need to be increased by more than five times in some example applications (ratio of 1.9V drop and 0.35V drop=1.9/0.35=5.43). This is also an unacceptable increase in terms of both price and solution size. Other solutions can result in system inaccuracies due to various values of VIN, inductance and output capacitors, and can cause systems to compromise output ripple versus load transient response.

According to certain aspects, the present embodiments provide a solution to the above and other problems. One solution, referred to herein as Energy Conservation Mode (ECM), aims to overcome large voltage dips during mode transitions. In embodiments, the new ECM scheme is implemented by minimally increasing complexity and current consumption. At a single replenish, the inductor replenish current reaches 120% of the maximum load. Due to the high energy transfer per replenish cycle to the output cap, the system of the present embodiments requires fewer switching events. The output voltage response is excellent at the mode transition from ECM to CCM. These and other embodiments can further include output overvoltage monitor circuitry which truncates the excessive charge transfer to the output capacitor in case the load current level is fairly low.

Figure 3:
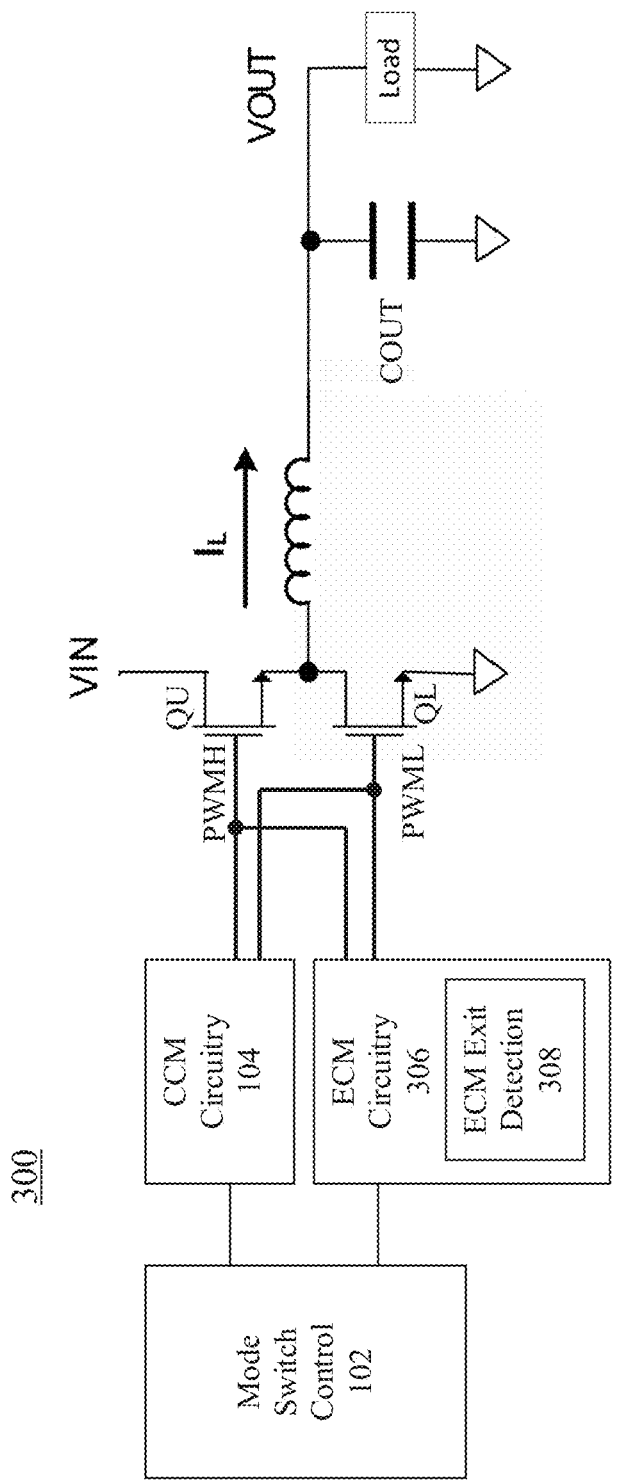
FIG. 3 is a block diagram illustrating an example converter according to the present embodiments.

FIG. 3 is a block diagram illustrating an example system according to embodiments. As can be seen in comparison with conventional system 100, system 300 includes ECM circuitry 306 in place of conventional DCM circuitry 106.

According to certain aspects, ECM circuitry 306 maintains output regulation at low load current levels using an ECM scheme. As will become more apparent from the detailed descriptions below, ECM mode conserves energy in battery operated systems by maintaining high efficiency at light load levels while maintaining the output voltage regulation within a small hysteresis band. Moreover, during load step, ECM circuitry continues to maintain output voltage regulation for a sufficient amount of time to allow for CCM circuitry 104 to get online.

In the illustrated example of FIG. 3, ECM circuitry 306 includes ECM exit detection circuitry 308. In embodiments to be described in more detail below, ECM exit detection circuitry 308 monitors certain operational parameters of ECM circuitry 306 and/or the load requirements so as to signal conditions when transitioning to CCM mode is appropriate. It should be noted that ECM exit detection circuitry 308 need not be included in all embodiments. It should be further noted that although ECM circuitry 306 and CCM circuitry 104 are shown separately for illustrating aspects of the present embodiments, they may be implemented together, and/or implemented with all or some shared components.

Figure 4:
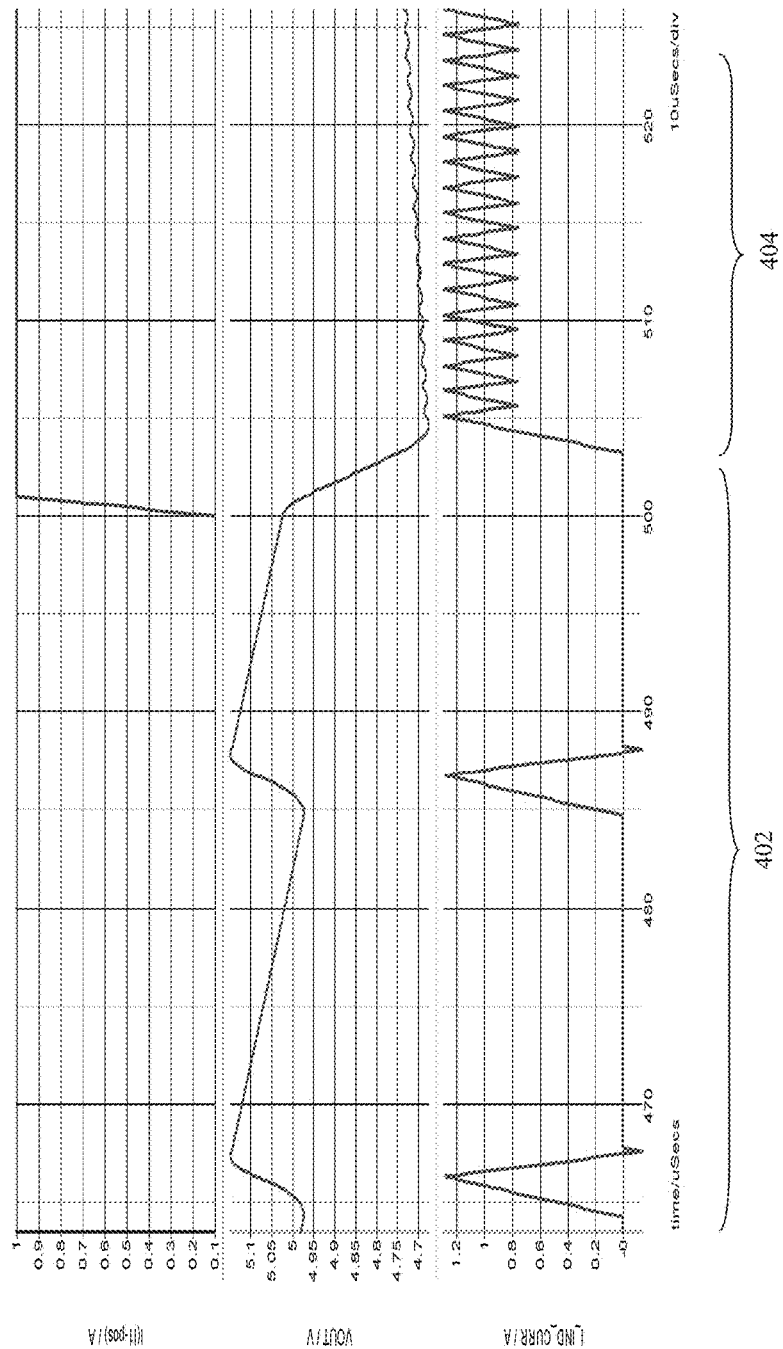
FIG. 4 is a timing diagram illustrating certain operational aspects of the converter according to embodiments shown in FIG. 3.

FIG. 4 is a timing diagram illustrating example operational aspects of system 300 according to embodiments.

In period 402 before load step and during light load conditions, ECM circuitry 306 operates similarly to conventional DCM, and maintains the output voltage VOUT within a small band. In an example of a car battery implementation (Vbat=12V, VOUT=5V, no Load, no switching), ECM mode battery current is reduced to 5 µA during normal ECM mode operation in period 402, while the output voltage VOUT is kept within about ±3% of 5V.

Differently from the conventional scheme, however, in response to a load step, ECM circuitry 306 provides a peak/valley current control scheme during period 404. As shown, in this example, during period 404, output voltage VOUT is kept above a −7% below peak level for 25 μs, or as long as necessary to awaken all circuitry necessary for CCM operation. As will become more apparent from the descriptions below, this is accomplished with minimal added complexity and without adding an excessive number of MLCC caps, for example.

Figure 5:
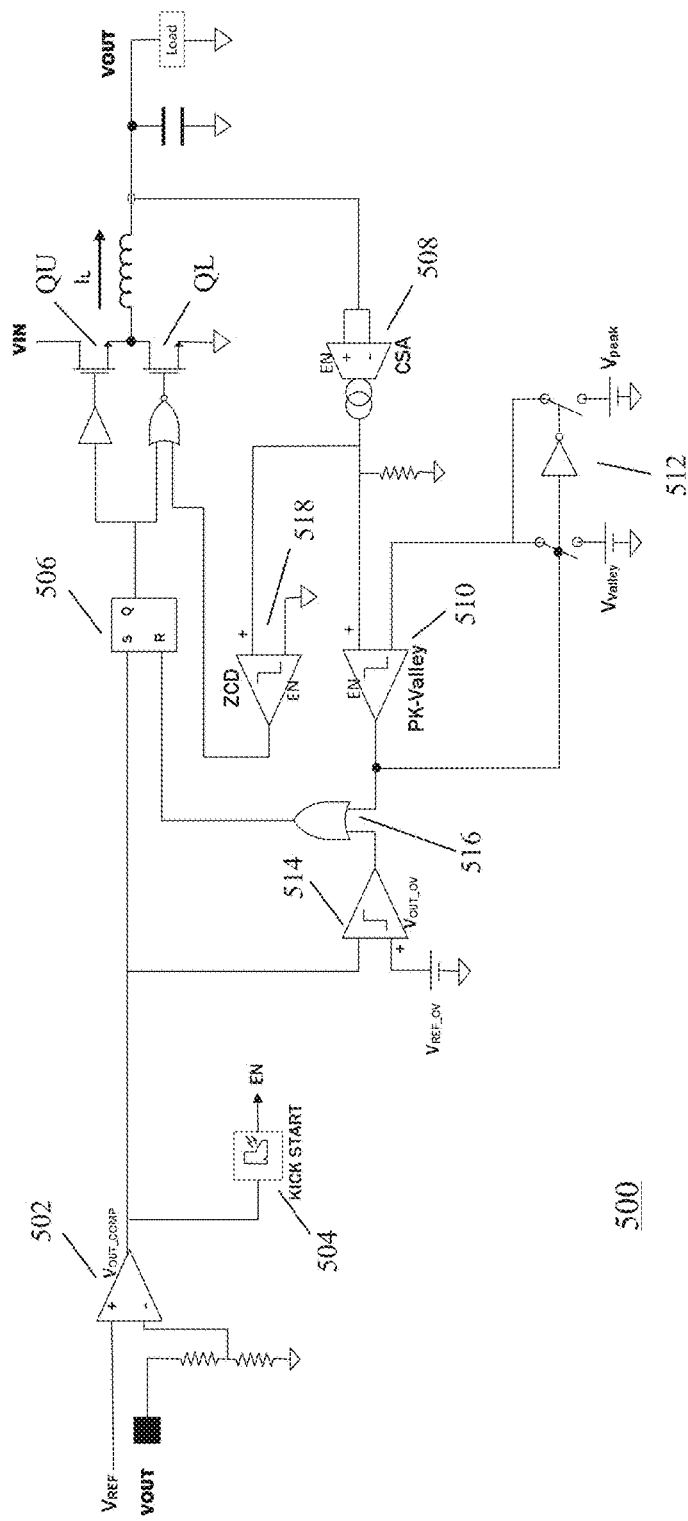
FIG. 5 is a circuit diagram illustrating an example of energy conservation mode circuitry according to embodiments.

FIG. 5 is a circuit diagram illustrating an example circuit 500 that can implement ECM mode circuitry 306 according to embodiments.

In this example circuit 500, output voltage comparator 502 has a positive input coupled to VREF and a negative input coupled to a fed back signal corresponding to the output voltage VOUT. Accordingly, when VOUT. Accordingly, when VOUT falls below VREF, the output VOUT_COMP of comparator 502 will go high.

Kick-start circuit 504 receives the signal VOUT_COMP and will generate an enable signal EN if the received signal is high for more than a threshold amount of time (e.g. 2 μs). Those skilled in the art will understand that there are many ways such a timing circuit can be implemented.

Latch 506 receives VOUT_COMP as a set input signal and will thus output a high signal on its Q output whenever VOUT_COMP goes high. Under this condition, high-side FET QH will be turned on and low-side FET QL will be turned off, and VIN will be provided to the load via IL. Latch 506 also receives a reset input as will be described in more detail below. In response to the reset signal going high, latch 506 will output a low signal on its Q output. Under this condition, high-side FET QH will be turned off and low-side FET QL will be turned on, connecting IL to ground.

Zero voltage detector 514 has a negative input coupled to VOUT_COMP and a positive input coupled to a reference, and thus detects when VOUT_COMP goes below the reference. In response to this condition, or when the output of peak-valley detector 510 goes high as will be described in more detail below, OR gate 516 will cause the reset input of latch 506 to go high, causing latch 506 to output a low signal on its Q output as described above.

Current sense amplifier 512 and peak-valley detector 510 are enabled when kick-start detector 504 outputs enable signal EN. Current sense amplifier 512 outputs a signal having a magnitude corresponding to the current through inductor IL. Peak-valley detector 510 receives this output from current sense amplifier 510 on its positive input and a signal from peak-valley circuit 514 on its negative input and outputs a signal dependent thereon. As described above, when the output of peak-valley detector 512 goes high, the reset input of latch 504 will go high via operation of OR gate 516, thus turning off QH and turning on QL as described above.

Peak-valley circuit 512 alternately provides a peak value reference or a valley value reference that is used by peak-valley detector 512 to determine when the output current as sensed by current sense amplifier 510 exceeds a peak value or falls below a valley value. In this example, peak-valley circuit 512 receives the output of peak-valley detector 510. Complementary switches are coupled between the positive input of peak-valley detector 510 and voltage sources respectively providing a peak value reference and a valley value reference. Depending on the output of peak-valley detector 512, one switch is closed and the other is opened, thereby respectively providing either the peak value reference or valley value reference to peak-valley detector 510.

As further shown in the example circuit 500 in FIG. 5, these and other embodiments include output overvoltage monitor circuitry which truncates the excessive charge transfer to the output capacitor in case the load current level is fairly low. In one example implementation shown in FIG. 5, zero-crossing detector 518 has a positive input connected to the output of current sense amplifier 512 and a negative input connected to ground. As such, the output of zero-crossing detector 518 is high whenever the current sensed by current sense amplifier 512 goes below zero. This will force the low-side FET QL to be tri-stated, regardless of the output of latch 506.

Further example operational details of ECM circuitry 306, such as the example implementation of circuit 500 shown in FIG. 5, will now be further described in connection with the waveforms shown in FIG. 6.

Figure 6:
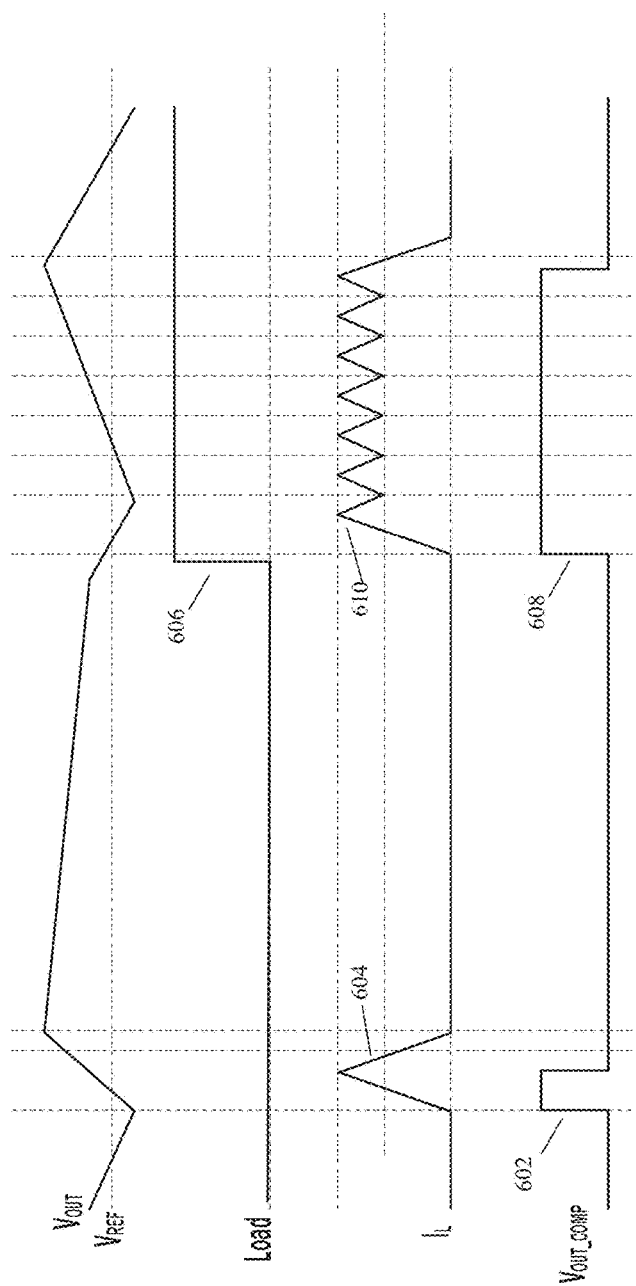
FIG. 6 is a timing diagram illustrating certain operational aspects of the circuitry according to embodiments shown in FIG. 5.

As shown in FIG. 6, during normal ECM operation, circuit 500 operates to provide voltage regulation such that when VOUT falls below VREF, the output of comparator 502 VOUT_COMP goes high as shown in 602. This sets latch 506 which causes the high-side FET QH to switch on and low-side FET QL to switch off, thereby allowing the inductor current IL to ramp up and charge up the output capacitor as shown in 604. When VOUT thereafter rises above VREF, VOUT_COMP goes low as also shown in 602. This causes the output of comparator 508 to go high, which resets latch 506. The reset causes the high-side FET QH to switch off and low-side FET QL to switch on, thereby causing the inductor current IL to ramp back down as further shown in 604 and thereafter causing the output voltage VOUT to gradually decline.

FIG. 6 further illustrates example aspects of how circuit 500 operates in the case of a load step (e.g., the instant when an electronic device connected to the circuit 500 is suddenly turned on, connected and/or activated). As shown in FIG. 6, a load step 606 causes the output voltage VOUT to drop below VREF, which further causes VOUT_COMP to go high as shown in 608. As in normal operation, this sets latch 506 which causes the high-side FET QH to switch on and low-side FET QL to switch off, thereby allowing the inductor current IL to ramp up. Differently from quiescent ECM operation, the load step will further cause VOUT_COMP to remain high for more than a threshold amount of time, as determined by kick-start circuit 504. This causes the current sense amplifier 508, peak-valley detector 510 and zero crossing detector 518 to be enabled. This further causes, during the load step state, the inductor current to ramp up and down between a peak current value and a valley current value as shown in 610.

In connection with the example of FIG. 5, this operation is controlled by the peak-valley detector 510 and peak-valley circuit 512. Initially, the output of peak-valley detector 510 is low, which causes the voltage reference for the peak current reference to be selected for input to detector 510. When the output current sensed by current sense amplifier 508 reaches the peak current value, the output of detector 510 goes high, which resets latch 506. The reset causes the high-side FET QH to switch off and low-side FET QL to switch on, thereby causing the inductor current IL to ramp back down. The output of detector 510 then causes the voltage reference for the valley current value to be selected for input to detector 510. When the output current sensed by current sense amplifier 508 reaches the valley current value, the output of detector 510 goes low, which allows latch 506 to be set by VOUT_COMP remaining high. This causes the high-side FET QL to switch on and low-side FET QL to switch off, thereby causing the inductor current IL to ramp back up. In some embodiments, in order to allow for a maximum load current transient during ECM, and to maintain the voltage regulation, the peak current level is set to 120% of the maximum load and the valley level is set to 80% of the maximum load.

According to certain aspects of the embodiments, and as shown in FIG. 6, the operation of circuit 500 in response to a load step prevents the output voltage from dropping excessively, and can bridge the gap between the time load step starts and when CCM circuitry can be activated.

As set forth above, in connection with the handoff from ECM circuitry 306 to CCM circuitry 104, additional or alternative embodiments include ECM exit determination circuitry 308.

Figure 7:
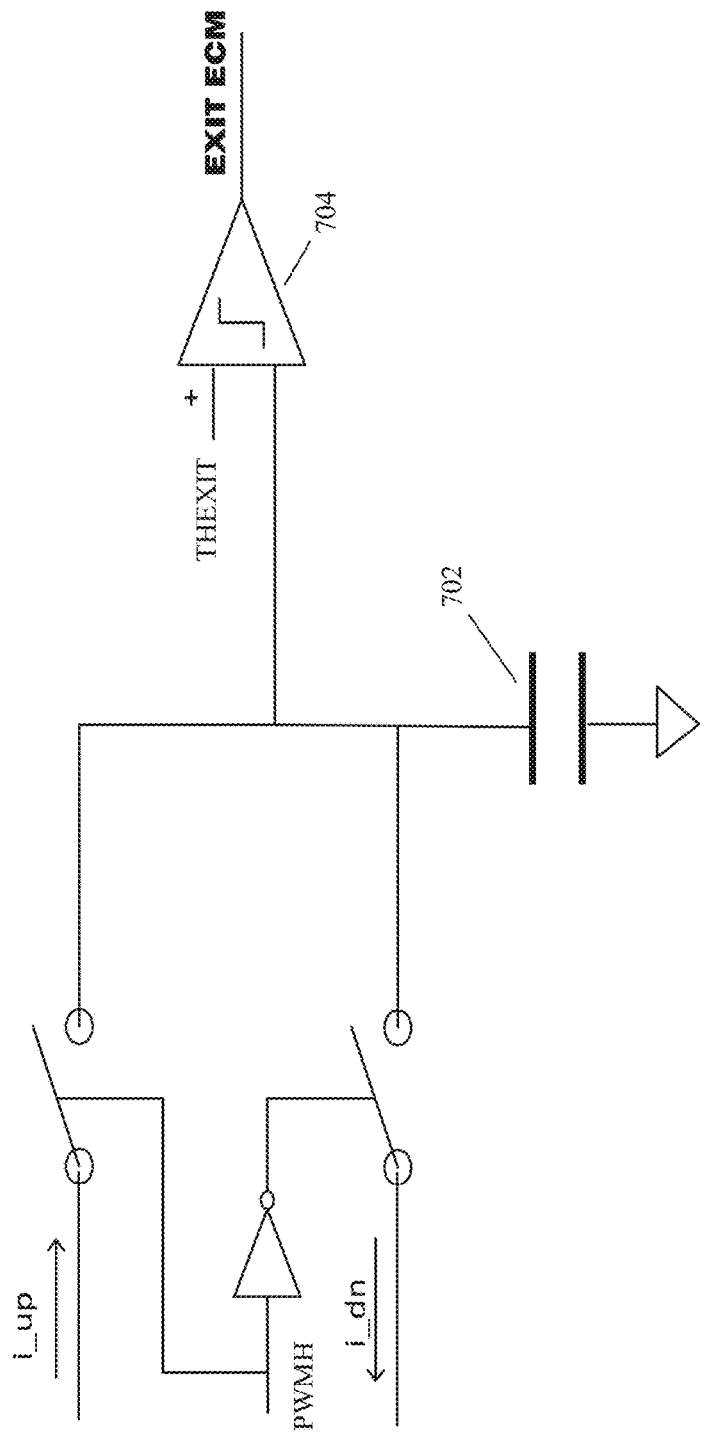
FIG. 7 is a circuit diagram illustrating an example of mode exit determination circuitry according to embodiments.

FIG. 7 is a diagram illustrating an example circuit implementation of circuitry 308. As shown in this example, during each replenish pulse (e.g., the period when the high side FET QH is turned on as indicated by signal PWMH), a current i_up is provided to charge up an internal reference cap 702 with a charge that is proportional to the charge added to the output filter cap COUT. During the tristate period, the reference cap 702 is discharged by a current set to i_dn. The charge left on the reference cap 702 is measured at the end of each hold cycle by comparator 704 to determine if the regulator output load current is greater than the exit current threshold. If so, an exit signal EXIT ECM is generated, in response to which control circuitry 102 can cause CCM circuitry 104 to be activated. This approach provides a low power, simple and accurate exit current threshold, without the need to power up the CSA amplifier to measure load current levels.

The exit determination technique and circuitry shown in FIG. 7 can be easily extended in various ways. For example, the ECM exit determination can be based on the load current exceeding a fixed or programmable fraction of the peak replenish current. More particularly, the programmable exit level threshold THEXIT can be given by the following equation:

$$THEXIT = \frac{i\_peak}{2} \times \frac{1}{\left(1 + N * \frac{i\_up}{i\_dn}\right)},$$

where i_peak is the peak load current, and N is programmable to change the exit threshold. For example, using a pin strap or other configurable mechanism, the programmed value of N can be used to cause the charging current i_up to be a desired multiple of the discharge current i_dn, using the implementation shown in FIG. 7.

Figure 8:
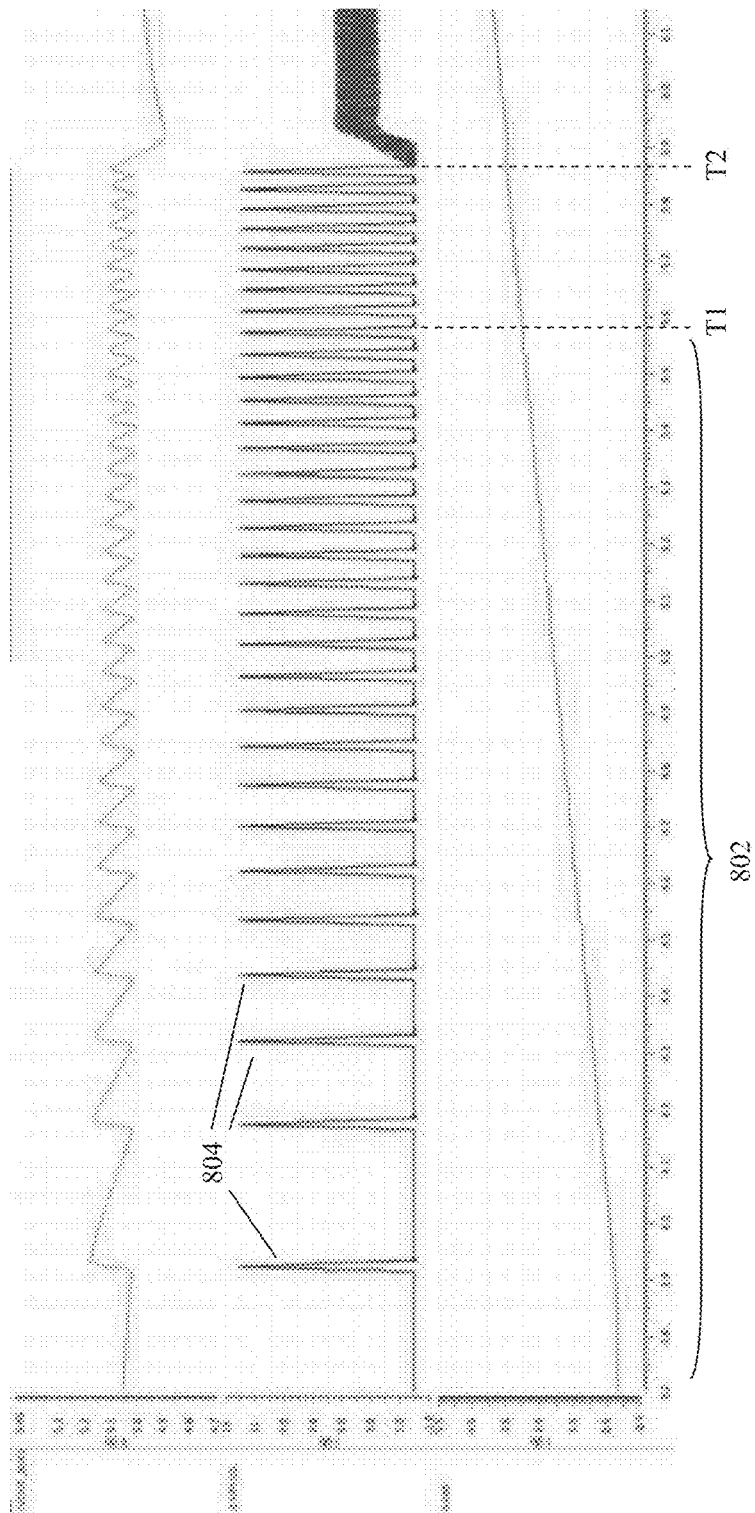
FIG. 8 is a timing diagram illustrating certain operational aspects of the circuitry according to embodiments shown in FIG. 7.

FIG. 8 is a timing diagram illustrating operation of an ECM exit determination technique such as that described above. In this example, the exit threshold THEXIT has been programmed such that ECM exit is detected when the load current is at 25% of the inductor peak. More particularly, as shown in FIG. 8, in response to load conditions, during period 802, the replenish pulses 804 are becoming more frequent, and the load current is increasing. In the example implementation of FIG. 7, this causes the charge in the reference cap 702 to build up towards the exit threshold THEXIT. At time T1, the exit threshold is reached, and the exit signal is sent to mode control circuitry 102. In this example, after 25 usec of CCM circuitry warm up time, the mode changes from ECM to CCM at time T2.

Still further variations and extensions of exit determination circuitry 308 according to embodiments are possible.

For example, embodiments of circuitry 308 such as the implementation in FIG. 7 can incorporate a self-calibrated ECM exit detection methodology that works for a wide range of inductance values. Such self-calibration can allow the same circuitry 308 to accommodate a wide range of conduction times caused by a corresponding wide range of possible inductor value selections.

Figure 9:
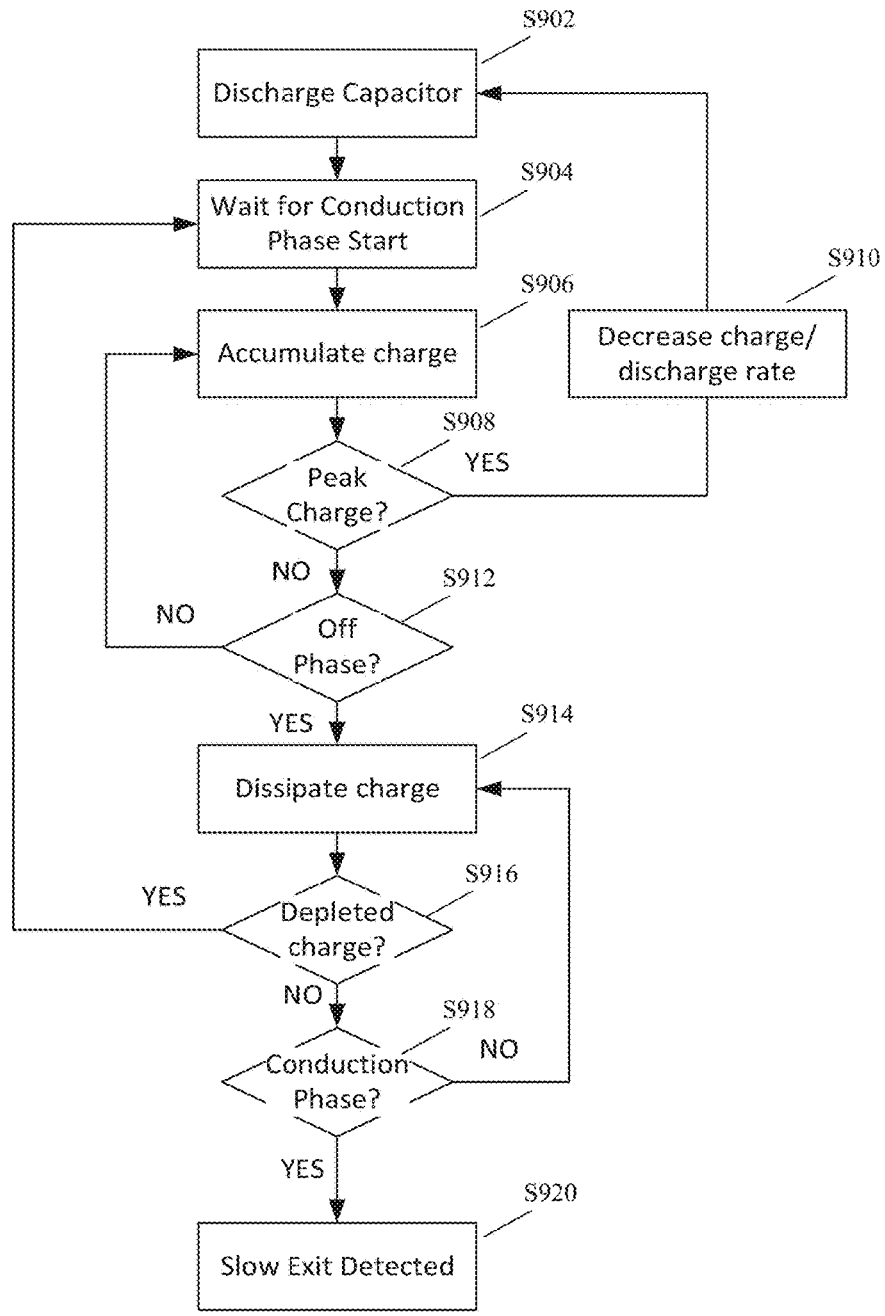
FIG. 9 is a flowchart illustrating an alternative example methodology for performing self-calibrated mode exit determination according to embodiments.

FIG. 9 is a flowchart illustrating an example methodology for self-calibrated exit determination according to embodiments. According to certain aspects, in this example, the rate of the ECM exit ramp is first adaptively selected until the maximum implementation voltage is avoided. This method permits proper conduction and off measurements thereafter regardless of the switching frequency or conduction/off ratio time.

As shown in the example of FIG. 9, in a first step S902, the reference cap is discharged and in a next step S904 the process waits until the start of the conduction phase. When the conduction phase starts, the process continues to step S906 where the charge in the reference cap is accumulated. In step S908, while the conduction phase is still active, it is determined whether the peak charge in the reference cap has been reached. If so, the charge accumulation rate is decreased (e.g., the i_up current is lowered) in step S910, and the process returns to step S902. Otherwise, processing advances to step S912, where the transition out of the conduction phase is detected. Until the transition to the off phase occurs, the steps S906 and S906 are repeated.

After the first conduction phase ends, as detected in step S912, the self-calibration process has been completed and the ECM exit determination processing such as that described in connection with the implementation of FIG. 7 and with the self-calibrated i_up and i_down current rates used in steps S906 and S908. More particularly, based on the circumstances detected in steps S916 and S918 of whether charge in the reference cap has not been depleted before the next conduction phase starts, the ECM exit determination is made in step S920.

Figure 10:
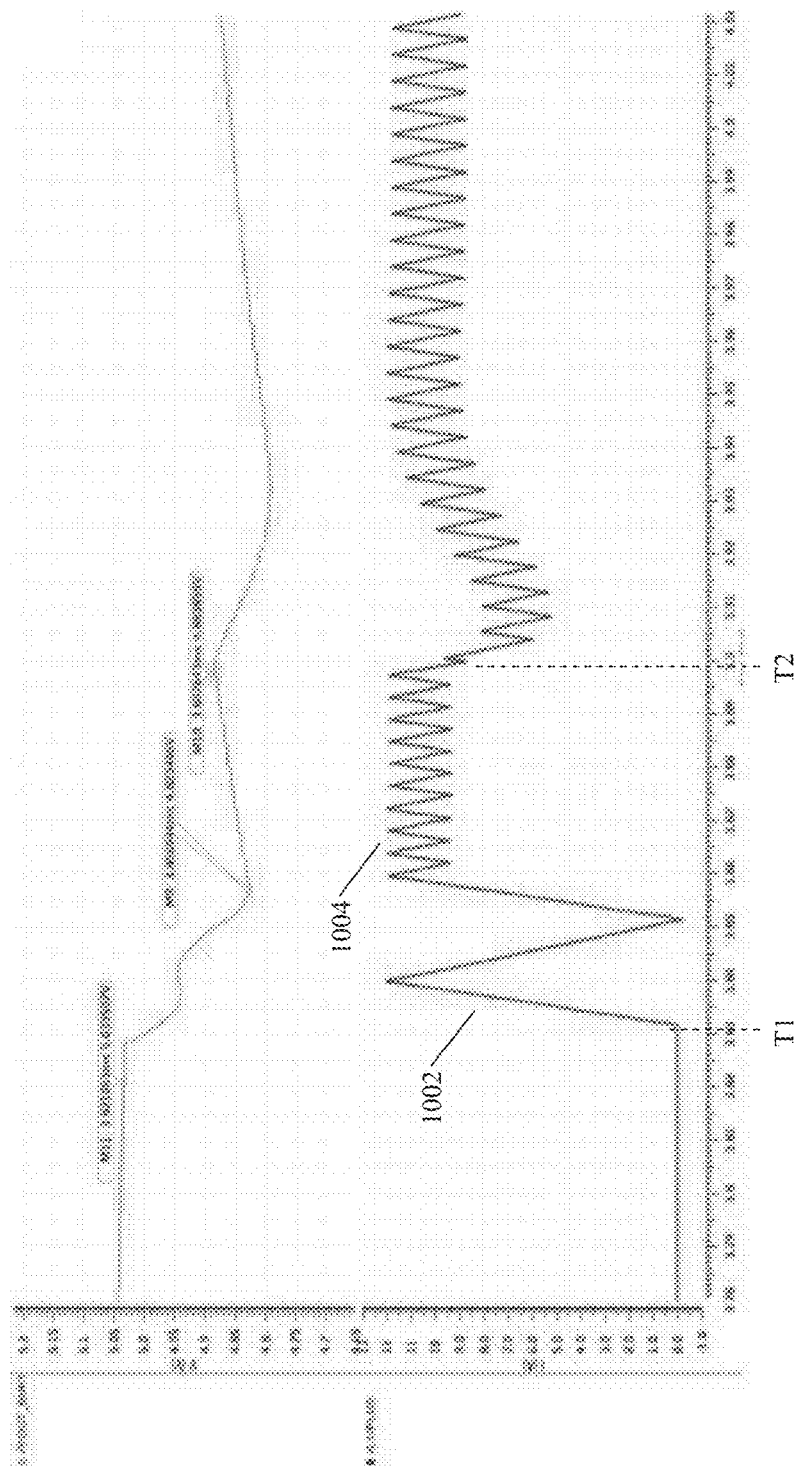
FIG. 10 is a timing diagram illustrating an alternative fast exit determination methodology according to embodiments.

It should be noted that even further variations for performing ECM exit determination are possible. For example, rather than the relatively "slow" determination processes described above in connection with the reference cap implementation of FIG. 7, other relatively "fast" exit determination schemes can be used to implement ECM exit determination circuitry 308. FIG. 10 is a timing diagram illustrating an example "fast" determination of ECM mode transition to CCM. In this example, ECM exit is detected by simply counting the number of peak-valley transitions after a load step. More particularly, as shown, after a load step at time T1, an initial replenish pulse 1002 is generated, then peak-valley pulses 1004 are generated as described above. Alternative ECM exit determination circuitry 308 then counts the number of peak-valley pulses 1004. After a threshold number of pulses 1004 are counted (which can be configured via a pin strap, for example), the exit signal is sent to control circuit 102. After 25 usec warm up time, for example, the mode changes from ECM to CCM at time T2.

FIGS. 11A to 13B are timing diagrams providing simulation results of example ECM circuitry 306 according to embodiments.

Figure 11A:
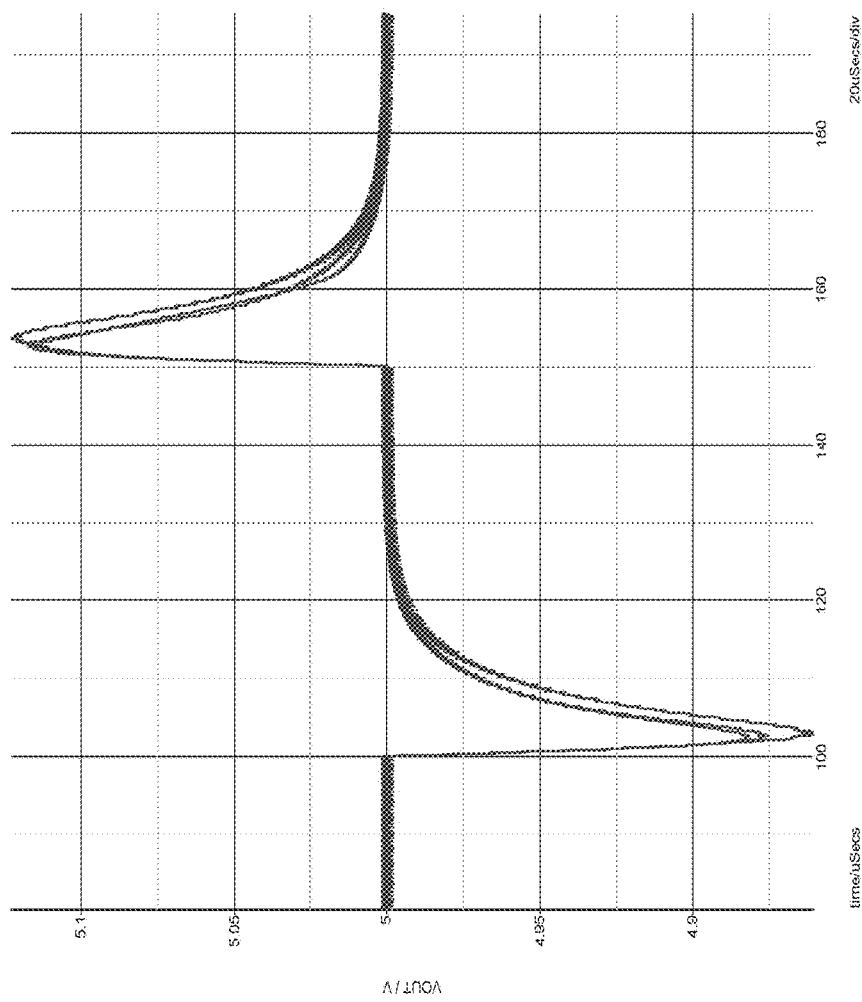
FIGS. 11A to 13B are timing diagrams providing simulation results of example energy conservation mode circuitry according to embodiments.
Figure 11B:
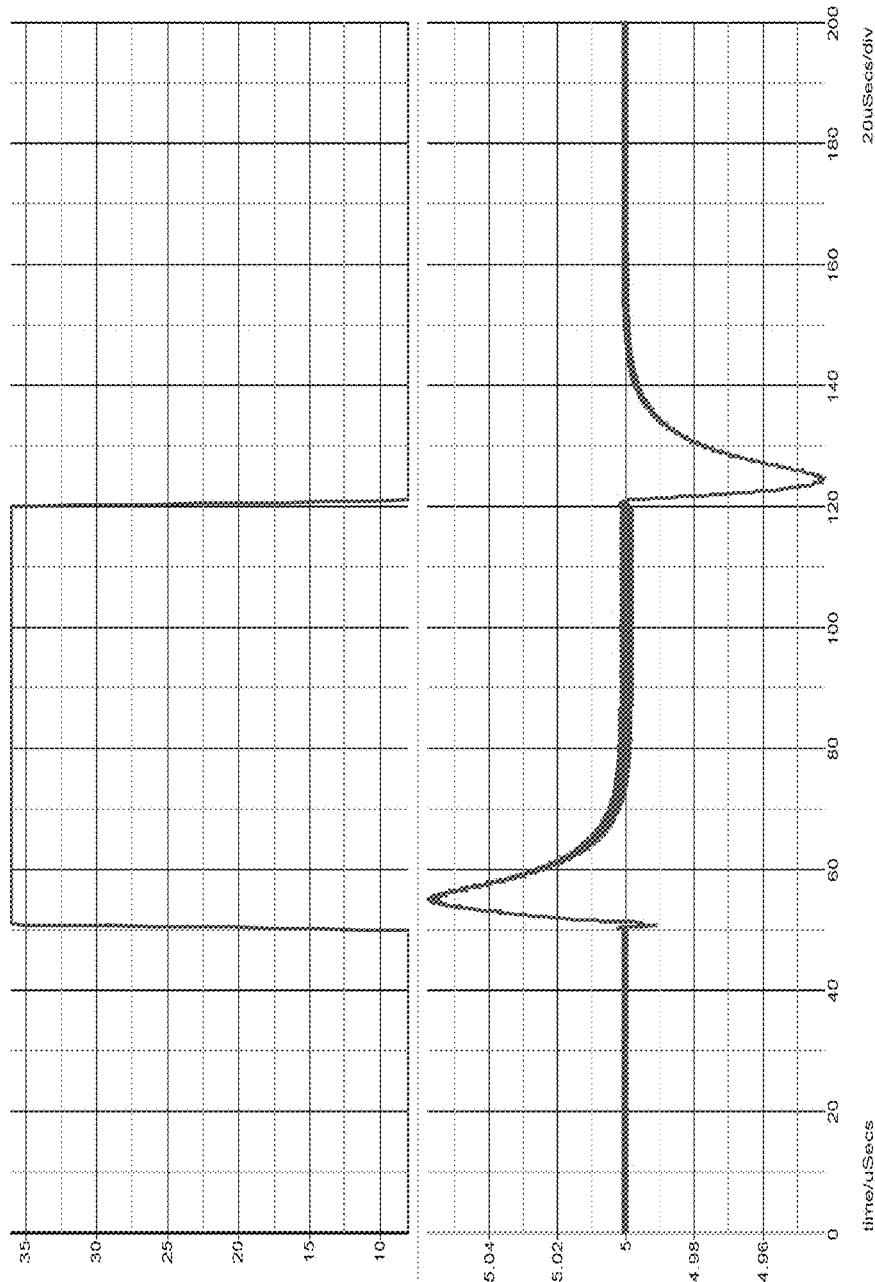

More particularly, FIGS. 11A and 11B are simulation results for a 50 W system. FIG. 11A illustrates the transient responses for $V_{IN}$=8V/12V/36V and a 6 A load step, which is 60% of $I_{MAX}$. FIG. 11B illustrates the line transient for a case where $V_{IN}$ transitions from 8V to 36V to 8V, with no load.

Figure 12A:
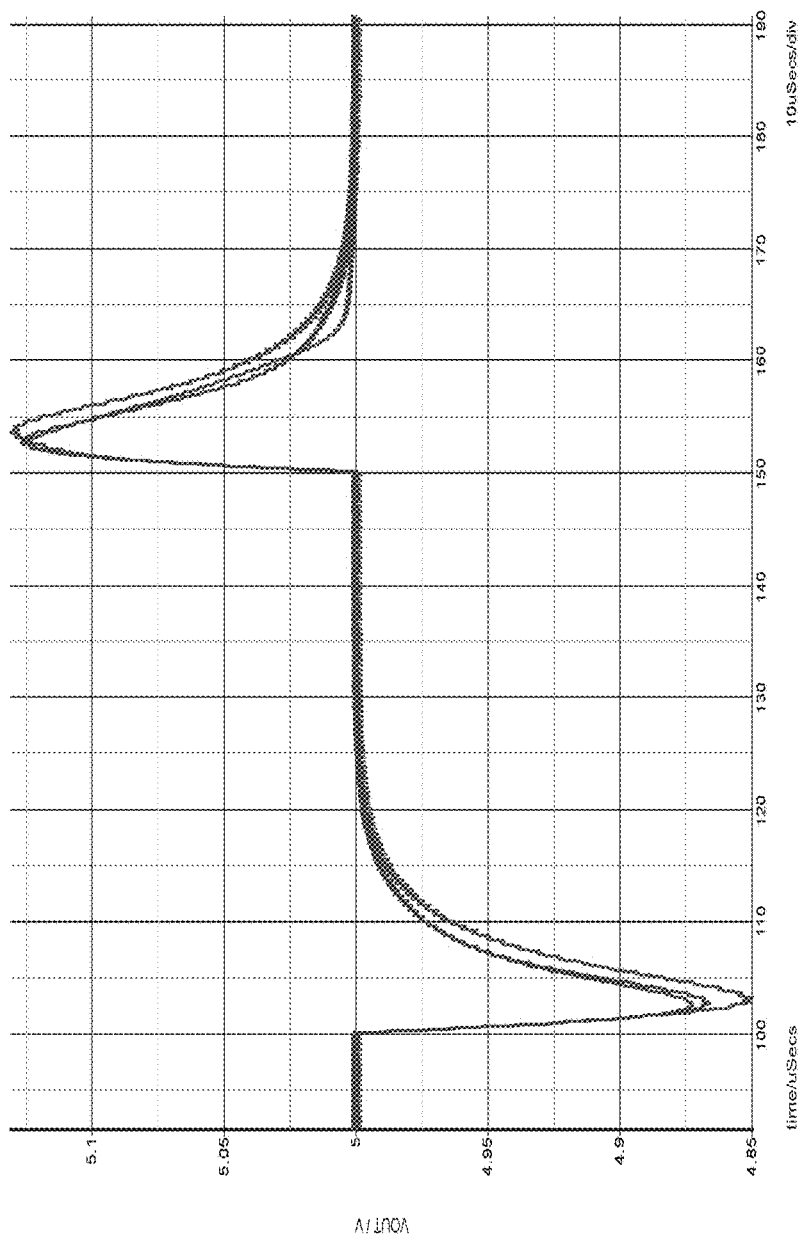
Figure 12B:
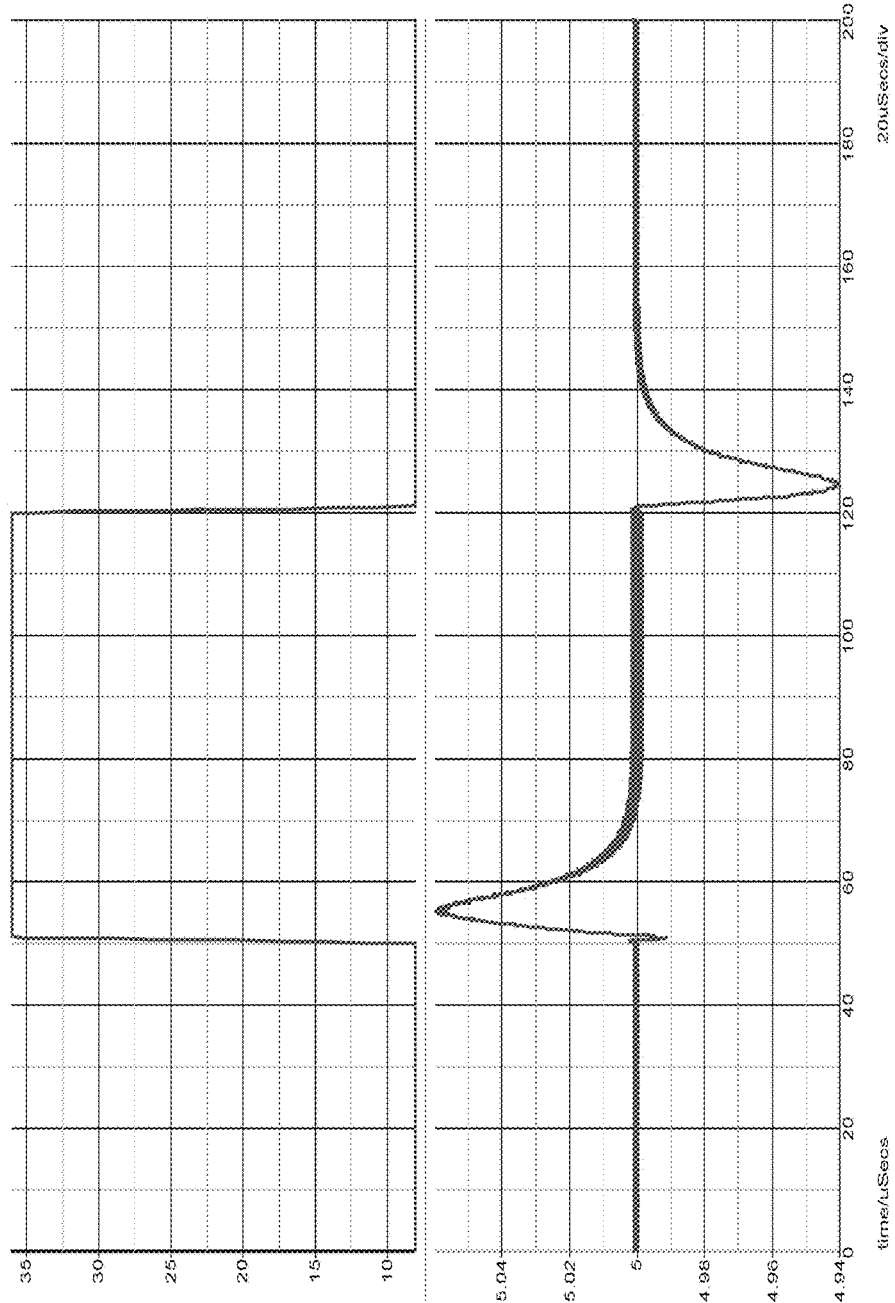

Similarly, FIGS. 12A and 12B are simulation results for a 25 system. FIG. 12A illustrates the transient responses for $V_{IN}$=8V/12V/36V and a 3 A load step, which is 60% of $I_{MAX}$. FIG. 12B illustrates the line transient for a case where $V_{IN}$ transitions from 8V to 36V to 8V, with no load.

Figure 13A:
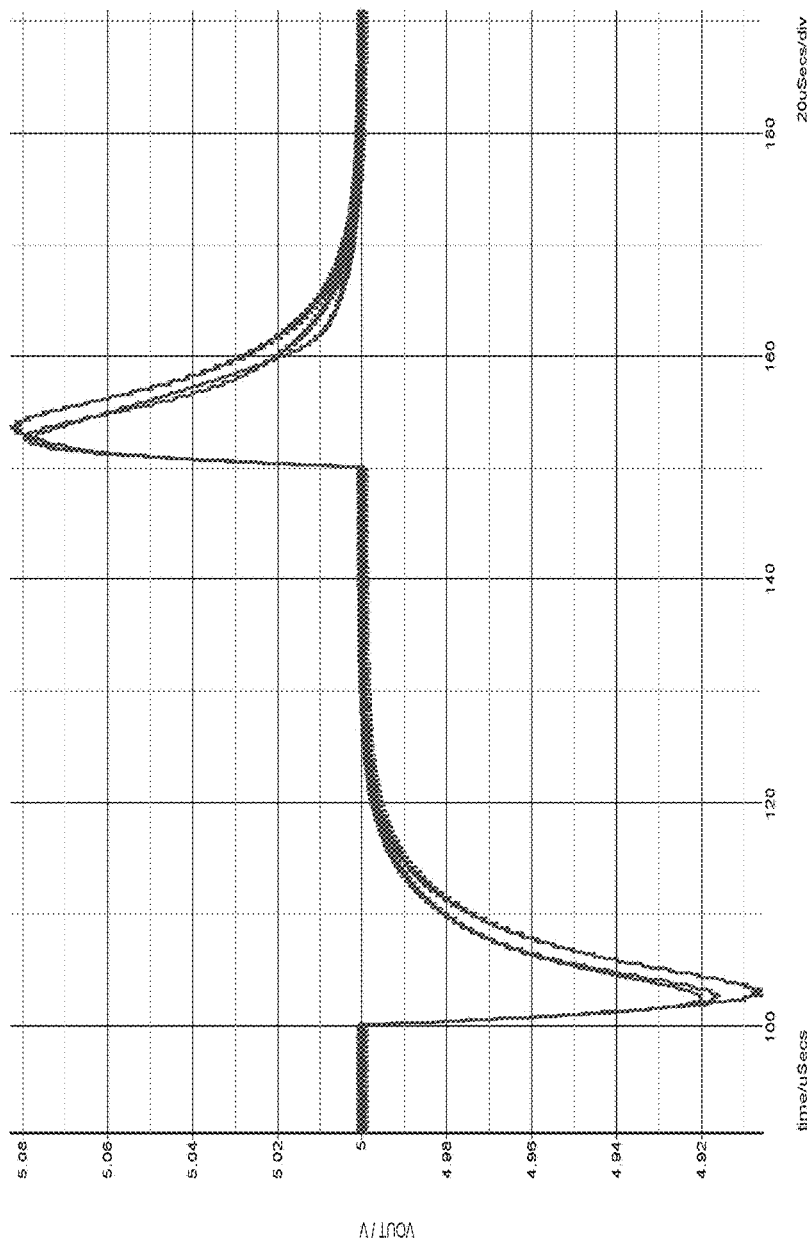
Figure 13B:
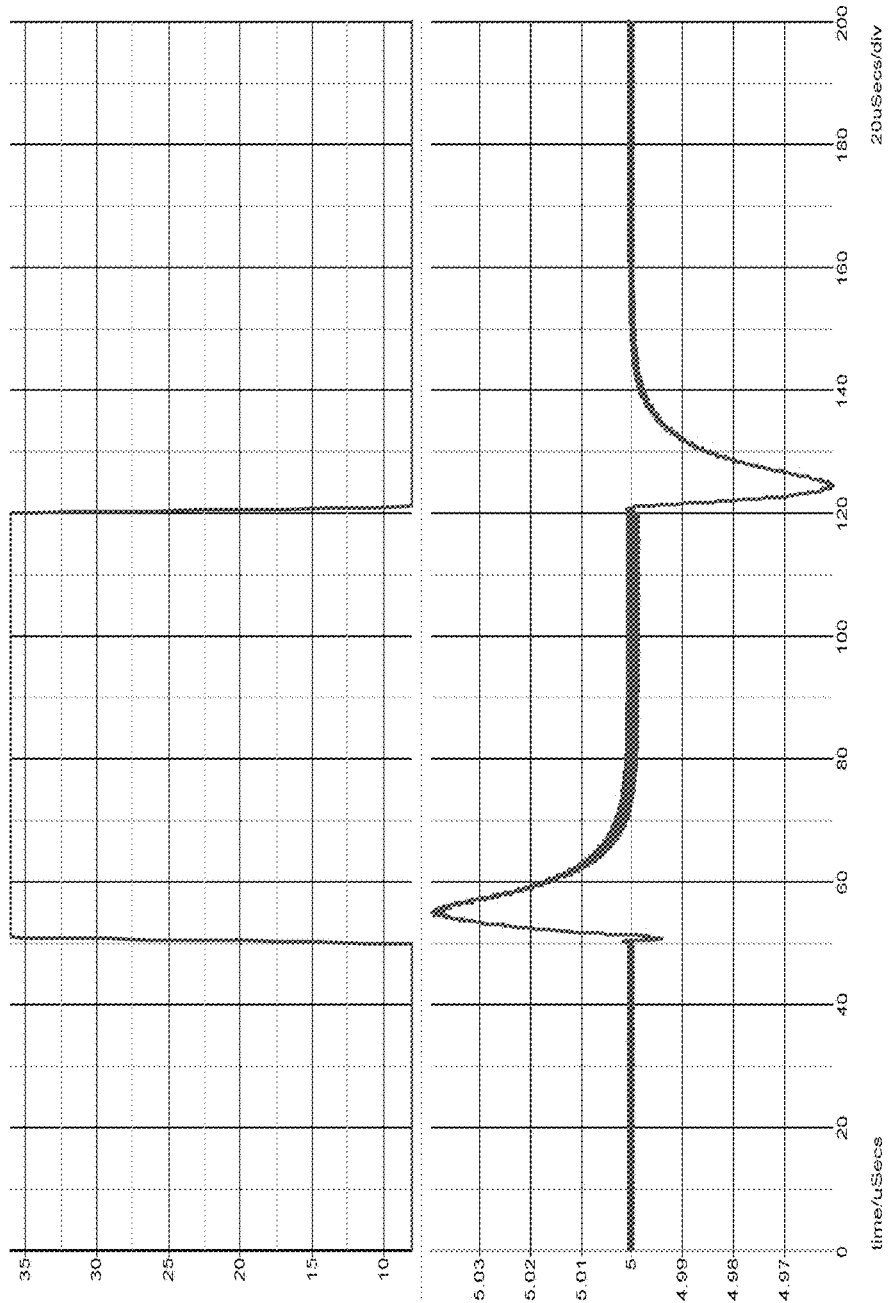

Likewise, FIGS. 13A and 13B are simulation results for a 5 W system. FIG. 13A illustrates the transient responses for $V_{IN}$=8V/12V/36V and a 600 mA load step, which is 60% of $I_{MAX}$. FIG. 13B illustrates the line transient for a case where $V_{IN}$ transitions from 8V to 36V to 8V, with no load.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A voltage regulator comprising:
    synchronous power switches having an output to a load; and
    energy conservation mode circuitry that is configured to, in response to a step in power drawn by the load, operate the synchronous power switches to prevent substantial voltage droop at the output for a time during a transition out of energy conservation mode,
    wherein the energy conservation mode circuitry includes exit detection circuitry for determining an end of the transition.

2. The voltage regulator of claim 1, wherein the time is sufficient for continuous conduction mode circuitry to assume operation of the synchronous power switches.

3. The voltage regulator of claim 1, wherein the energy conservation mode circuitry includes peak-valley circuitry for causing the synchronous power switches to continuously provide current amounts between a peak current level and a valley current level to the output during the time.

4. The voltage regulator of claim 1, wherein the exit detection circuitry includes a capacitor that is charged and discharged in correspondence with operation of the synchronous power switches.

5. The voltage regulator of claim 4, wherein a relative amount of the charge and discharge is programmable.

6. The voltage regulator of claim 1, wherein the exit detection circuitry includes self-calibration functionality for accommodating a range of conduction times of the synchronous power switches.

7. The voltage regulator of claim 1, wherein the exit detection circuitry includes a counter for counting a number of inductor replenish sequences caused by the synchronous power switches.

8. A voltage regulator comprising:
    synchronous power switches having an output to a load; and
    energy conservation mode circuitry that is configured to, in response to a step in power drawn by the load, operate the synchronous power switches to prevent substantial voltage droop at the output for a time during a transition out of energy conservation mode,
    wherein the energy conservation mode circuitry includes peak-valley circuitry for causing the synchronous power switches to continuously provide current amounts between a peak current level and a valley current level to the output during the time, and
    wherein the energy conservation mode circuitry includes a kick-start circuit that enables the peak-valley circuitry to begin operating in response to the step.

9. The voltage regulator of claim 8, wherein the energy conservation mode circuitry further includes a current sense amplifier that is also enabled by the kick-start circuit to begin operating to sense a current produced at the output by the synchronous power switches, the peak-valley circuitry using an output of the current sense amplifier when it is operating.

10. A method of operating a voltage regulator comprising:
    controlling operation of synchronous power switches having an output to a load using energy conservation mode circuitry; and
    in response to a step in power drawn by the load, operating the synchronous power switches to prevent substantial voltage droop at the output for a time during a transition out of energy conservation mode,
    wherein controlling operation of the synchronous power switches by the energy conservation mode circuitry includes determining an end of the transition.

11. The method of claim 10, wherein the time is sufficient for continuous conduction mode circuitry to assume controlling operation of the synchronous power switches.

12. The method of claim 10, wherein controlling operation of the synchronous power switches using energy conservation mode circuitry includes causing the synchronous power switches to continuously provide current amounts between a peak current level and a valley current level to the output during the time.

13. The method of claim 12, wherein controlling operation of the synchronous power switches using the energy conservation mode circuitry includes enabling peak-valley circuitry to begin operating in response to the step.

14. The method of claim 13, wherein the controlling operation of the synchronous power switches by the energy conservation mode circuitry further includes enabling a current sense amplifier to begin operating to sense a current produced at the output by the synchronous power switches, the peak-valley circuitry using an output of the current sense amplifier when it is operating.

15. The method of claim 10, wherein determining includes charging and discharging a capacitor in correspondence with operation of the synchronous power switches.

16. The method of claim 15, wherein a relative amount of the charging and discharging is programmable.

17. The method of claim 10, wherein determining includes performing self-calibration for accommodating a range of conduction times of the synchronous power switches.

18. The method of claim 10, wherein determining includes counting a number of inductor replenish sequences caused by the synchronous power switches.

\* \* \* \* \*